(12) United States Patent
Hayashi

(10) Patent No.: US 9,546,927 B2
(45) Date of Patent: Jan. 17, 2017

(54) OPTICAL PULSE TESTER

(71) Applicants: YOKOGAWA ELECTRIC CORPORATION, Tokyo (JP); YOKOGAWA METERS & INSTRUMENTS CORPORATION, Tokyo (JP)

(72) Inventor: Koji Hayashi, Tokyo (JP)

(73) Assignees: YOKOGAWA ELECTRIC CORPORATION, Tokyo (JP); YOKOGAWA METERS & INSTRUMENTS CORPORATION, Tokyo (JP)

( * ) Notice: Subject to any disclaimer, the term of this patent is extended or adjusted under 35 U.S.C. 154(b) by 19 days.

(21) Appl. No.: 14/818,620

(22) Filed: Aug. 5, 2015

(65) Prior Publication Data
US 2016/0069774 A1 Mar. 10, 2016

(30) Foreign Application Priority Data
Sep. 8, 2014 (JP) ................. 2014-182515

(51) Int. Cl.
*G01M 11/00* (2006.01)
*H04B 10/071* (2013.01)

(52) U.S. Cl.
CPC ..... *G01M 11/3145* (2013.01); *G01M 11/3109* (2013.01); *G01M 11/3127* (2013.01); *G01M 11/3136* (2013.01); *H04B 10/071* (2013.01)

(58) Field of Classification Search
CPC ... G01M 11/30; G01M 11/31; G01M 11/3109; G01M 11/3118; G01M 11/3127; G01M 11/3136; G01M 11/3145; G01M 11/3154; G01M 11/3163; G01M 11/33; G01M 11/331; G01M 11/332; G01M 11/333; G01M 11/334; G01M 11/335; G01M 11/336; G01M 11/337; G01M 11/338; G01M 11/39; H04B 10/071
See application file for complete search history.

(56) References Cited

U.S. PATENT DOCUMENTS 5,129,722 A * 7/1992 Mader ................ G01M 11/3145
345/157
5,396,444 A * 3/1995 Cannon .................. G01R 23/16
708/145
(Continued)

FOREIGN PATENT DOCUMENTS

JP 09-145538 A 6/1997
JP 11119027 A 4/1999
(Continued)

OTHER PUBLICATIONS

AQ7270 Series OTDR Operation Guide, Sep. 2011, Yokogawa Meters & Instruments Corporation, IM 735020-02E 6th Edition, pp. 1-47.*
(Continued)

Primary Examiner — Gordon J Stock, Jr.
(74) Attorney, Agent, or Firm — Sughrue Mion, PLLC

(57) ABSTRACT

An optical pulse tester includes: an OTDR measurer configured to execute an OTDR function of measuring a time distribution of a power of return light of an optical pulse input to an optical fiber; a display configured to display an OTDR measurement screen indicating information on execution of the OTDR function; and a controller configured to control the OTDR measurer and the display. The controller displays, on the OTDR measurement screen, a menu for allowing an operating person to call an auxiliary function for measurement of the optical fiber, and displays, on the OTDR measurement screen, a sub-screen indicating information on execution of the auxiliary function called by the operating person.

6 Claims, 7 Drawing Sheets

(56) References Cited

U.S. PATENT DOCUMENTS

| | | | | |
|---|---|---|---|---|
| 5,801,953 | A * | 9/1998 | Thoma | G01M 11/3145 |
| | | | | 708/145 |
| 6,011,546 | A * | 1/2000 | Bertram | H04N 21/443 |
| | | | | 348/563 |
| 6,259,993 | B1 | 7/2001 | Hori | |
| 6,326,987 | B2 * | 12/2001 | Alexander | 345/440.1 |
| 6,359,620 | B1 * | 3/2002 | Fujita | G01R 13/30 |
| | | | | 345/440.1 |
| 6,445,445 | B1 * | 9/2002 | Nakayama | G01M 11/3136 |
| | | | | 356/73.1 |
| 6,460,000 | B1 | 10/2002 | Nakayama et al. | |
| 7,620,513 | B2 * | 11/2009 | Nakayama | G01M 11/3136 |
| | | | | 356/73.1 |
| 2004/0015309 | A1 * | 1/2004 | Swisher | H04L 41/0813 |
| | | | | 702/79 |

FOREIGN PATENT DOCUMENTS

| | | |
|---|---|---|
| JP | 200121451 A | 1/2001 |
| JP | 2009-58279 A | 3/2009 |

OTHER PUBLICATIONS

AQ7275 OTDR: Optical Time Domain Reflectometer, 2012, Yokogawa, Bulletin AQ7275-03EN, pp. 1-8.*

"All-in-One handheld optical fiber network test tool Bulletin AQ1200-10EN", Yokogawa Meters & Instruments Corporation, 2011, XP055241757, Retrieved from the Internet: URL: http://www.optovit.cz/pdf/Yokogawa%20AQ1200.pdf (7 pages total).

* cited by examiner

OPTICAL PULSE TESTER

CROSS-REFERENCE TO RELATED APPLICATION

This application claims priority from Japanese Patent Application No. 2014-182515 filed with the Japan Patent Office on Sep. 8, 2014, the entire content of which is hereby incorporated by reference.

BACKGROUND

1. Technical Field

The present disclosure relates to an optical pulse tester.

2. Description of the Related Art

In optical communication systems configured to perform, e.g., data communication with optical signals, optical fibers are used as media for transmitting the optical signals. In, e.g., laying, transferring, and maintenance of the optical fiber, the length of the optical fiber and loss and reflection at a connection portion of the optical fiber are evaluated, for example. Optical pulse testers (OTDRs: Optical Time Domain Reflectometers) are used as measuring instruments. The optical pulse tester emits, as measurement light, an optical pulse to a measurement target optical fiber connected to an optical connector. The optical pulse tester measures, in a time domain, the power of return light (backscattered light and/or Fresnel reflection light) returning to an input end. Moreover, the optical pulse tester displays measurement results, and analyzes the measurement results, for example.

The return light such as backscattered light returns to an input side in a delay time proportional to the distance from a reflection point. The return light forms a characteristic waveform at, e.g., a welded point, a connector connection point, a branching point, a bending point, and a cutting point of the optical fiber. Thus, an event at the optical fiber is detected from the waveform of the power of the return light, the event including, e.g., the welded point, the connector connection point, the branching point, the bending point, and the cutting point. Then, the distance to the event (the position of the event) is measured.

Of optical pulse testers in practical use, an optical pulse tester has various auxiliary functions in addition to the original OTDR function of analyzing the time distribution of the power of the return light. Examples of the auxiliary functions include a stabilized light source function, a visible light source function, an optical power meter function, and a fiber end face inspection function.

FIG. 6 is a view illustrating a menu system of a typical optical pulse tester having a plurality of auxiliary functions. As illustrated in FIG. 6, in the typical optical pulse tester, menu items for calling the function of "OTDR measurement," a "stabilized light source," a "visible light source," an "optical power meter," or "end face inspection" are displayed as a top screen.

For example, when the "OTDR measurement" is selected, an OTDR measurement screen is displayed. When the "stabilized light source" is selected, a screen for light emission of a light source is displayed. When the "optical power meter" is selected, a screen indicating an input optical power is displayed. A user can select, from the top screen, a menu item of a function corresponding to a measurement purpose to cause the optical pulse tester to execute a desired function.

Examples of documents on this field include JP-A-09-145538.

SUMMARY

An optical pulse tester includes: an OTDR measurer configured to execute an OTDR function of measuring a time distribution of a power of return light of an optical pulse input to an optical fiber; a display configured to display an OTDR measurement screen indicating information on execution of the OTDR function; and a controller configured to control the OTDR measurer and the display. The controller displays, on the OTDR measurement screen, a menu for allowing an operating person to call an auxiliary function for measurement of the optical fiber, and displays, on the OTDR measurement screen, a sub-screen indicating information on execution of the auxiliary function called by the operating person.

DESCRIPTION OF THE EMBODIMENTS

Figure 1:
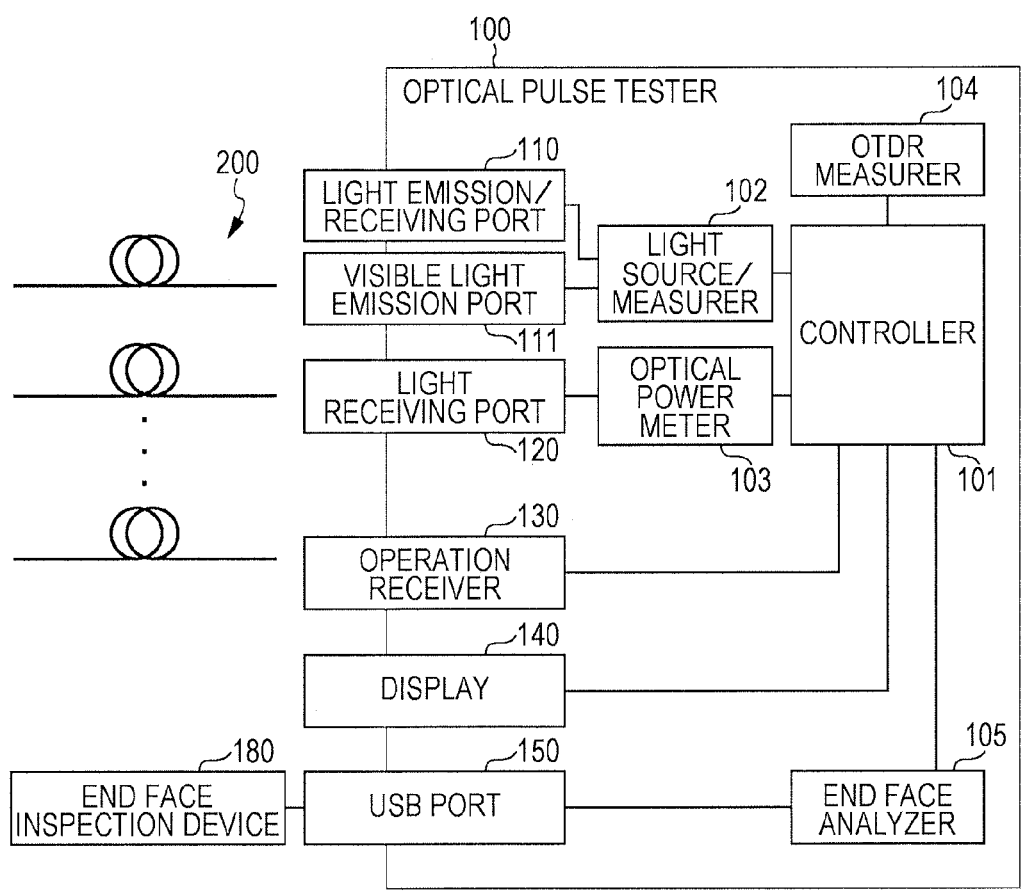
FIG. 1 is a block diagram illustrating the configuration of an optical pulse tester of an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In general, multicore optical fiber cables are used at, e.g., data centers. In operation for, e.g., laying, transferring, and maintenance of optical fibers, a typical series of processing is often performed sequentially for a plurality of optical fibers.

The following processes (1) to (3) are, as a specific example, performed sequentially for many optical fibers:

(1) inspection of the end face state of the optical fibers by a fiber end face inspection function;

(2) checking of an optical power by an optical power meter function; and (3) OTDR measurement by an OTDR function.

In the case of performing the above-described series of processing by using a typical optical pulse tester, an operating person performs the following operations sequentially for optical fibers:

(1) select a menu item of "End Face Inspection" from a top screen;

(1-1) connect the optical fiber to an end face inspection device connected to an USB port;

(1-2) check the presence or absence of a problem by observation of an end face state;

(1-3) return to the top screen;

(2) select a menu item of "Optical Power Meter" from the top screen;

(2-1) connect the optical fiber to an optical connector functioning as a light receiving port of a power meter, and note that another operating person outputs, using a light source device, measurement light to the end of the optical fiber which is not connected to the optical connector;

(2-2) measure an optical power to check whether or not OTDR measurement is available;

(2-3) return to the top screen;

(3) select a menu item of "OTDR Measurement" from the top screen;

(3-1) connect the optical fiber to an optical connector functioning as a light emission/receiving port for the OTDR measurement;

(3-2) perform the OTDR measurement to save measurement results; and (3-3) return to the top screen.

As described above, the operating person frequently switches a screen by way of the top screen. For this reason, the operation becomes complicated. Moreover, a menu system is configured such that after completion of a certain function, another function is performed. For this reason, each function is independently performed, resulting in poor operation efficiency.

In order to enhance the operation efficiency, the following operation is conceivable: during OTDR measurement for a certain optical fiber, another optical pulse tester is used to inspect the end face of another optical fiber. However, a plurality of optical pulse testers is used, leading to complicated handling of the optical pulse testers and uneconomical operation.

For the above-described reasons, the present disclosure is, as one purpose, intended to enhance operation efficiency when processing is performed for a plurality of optical fibers by an optical pulse tester having auxiliary functions.

An optical pulse tester according to one embodiment of the present disclosure (the present tester) includes: an OTDR measurer configured to execute an OTDR function of measuring a time distribution of a power of return light of an optical pulse input to an optical fiber; a display configured to display an OTDR measurement screen indicating information on execution of the OTDR function; and a controller configured to control the OTDR measurer and the display. The controller displays, on the OTDR measurement screen, a menu for allowing an operating person to call an auxiliary function for measurement of the optical fiber, and displays, on the OTDR measurement screen, a sub-screen indicating information on execution of the auxiliary function called by the operating person.

The present tester may further include: a first port for the OTDR function; a second port for the auxiliary function for the measurement of the optical fiber; and an auxiliary function executer configured to execute the auxiliary function for the measurement of the optical fiber. The controller may control the auxiliary function executer.

The controller may control the auxiliary function executer according to an execution instruction of the operating person input to the sub-screen, and executes the called auxiliary function.

The controller may execute the OTDR function and the auxiliary function in parallel.

The auxiliary function can include at least one of a stabilized light source function of continuously emitting measurement light, a visible light source function of emitting visible light, an optical power meter function of measuring a power of light emitted from the optical fiber, and a fiber end face inspection function.

The controller can pop up the menu according to a predetermined operation of the operating person.

According to the present tester, operation efficiency when processing is performed for a plurality of optical fibers by an optical pulse tester having auxiliary functions can be enhanced.

An embodiment of the present disclosure will be described with reference to drawings. FIG. 1 is a block diagram illustrating the configuration of an optical pulse tester 100 of the present embodiment. The optical pulse tester 100 has the OTDR function of analyzing the time distribution of the power of return light. Moreover, the optical pulse tester 100 has, as auxiliary functions for measurement of an optical fiber, a stabilized light source function, a visible light source function, an optical power meter function, and a fiber end face inspection function.

The stabilized light source function described herein is the function of continuously emitting measurement light from an optical connector. The optical pulse tester 100 with this function can be used as, e.g., a light source for loss measurement. The visible light source function is the function of continuously emitting visible light from an optical connector. The optical pulse tester 100 with this function can be used for, e.g., checking of the core of a multicore fiber and visual checking of a failure portion.

The optical power meter function is the function of measuring the power of light emitted from an optical fiber connected to an optical connector. The optical pulse tester 100 with this function can be used for, e.g., checking of the optical power in connection testing or failure occurrence.

The fiber end face inspection function is, e.g., the function of enlarging an end face image of an optical fiber. The optical pulse tester 100 with this function can be used for checking of connectivity of a connector of an optical fiber. For example, an end face inspection device connected to an USB port is used for end face inspection.

In the present embodiment, the case where the optical pulse tester 100 sequentially performs, for a plurality of optical fibers 200, fiber end face inspection, optical power measurement, and OTDR measurement will be described as an example. As illustrated in FIG. 1, the optical pulse tester 100 includes a controller 101, a light source/measurer 102, an optical power meter 103, an OTDR measurer 104, an end face analyzer 105, a light emission/receiving port 110, a visible light emission port 111, a light receiving port 120, an operation receiver 130, a display 140, an USB port 150.

The light source/measurer 102, the optical power meter 103, and the end face analyzer 105 are examples of an auxiliary function executer. The light emission/receiving port 110 is one example of a first port. The visible light emission port 111, the light receiving port 120, and the USB port 150 are examples of a second port. The optical fibers 200 are connected to the first and second ports.

The controller 101 controls, according to a user operation received via the operation receiver 130, measurement processing and various operations in the optical pulse tester 100.

The light source/measurer 102 performs, in execution of the OTDR function, light emission processing of light emitted to the optical fiber 200 connected to the light emission/receiving port 110 and light receiving processing of return light. Moreover, the light source/measurer 102 performs, in execution of the stabilized light source function, light emission processing of continuous light emitted to the optical fiber 200 connected to the light emission/receiving port 110. Further, the light source/measurer 102 performs, in execution of the visible light source function, light emission processing of visible light emitted to the optical fiber 200 connected to the visible light emission port 111.

That is, the controller 101 controls the light source/measurer 102 and the OTDR measurer 104 according to an instruction from the operating person, and then, executes the OTDR function (OTDR measurement). The controller 101 controls the light source/measurer 102 according to an instruction from the operating person, and then, executes the stabilized light source function or the visible light source function. The controller 101 controls the optical power meter 103 according to an instruction from the operating person, and then, executes the optical power meter function. The controller 101 controls the end face analyzer 105 according to an instruction from the operating person, and then, executes the fiber end face inspection function.

The optical power meter 103 measures, in execution of the optical power meter function, the power of light emitted from the optical fiber 200 connected to the light receiving port 120. Note that the light receiving port 120 and the visible light emission port 111 may be the same port.

The OTDR measurer 104 performs, in execution of the OTDR function, the OTDR measurement based on the results of the light emission/receiving processing of the light source/measurer 102.

The end face analyzer 105 is, in execution of the fiber end face inspection function, connected to an end face inspection device 180 via the USB port 150. The end face analyzer 105 checks the connector connectivity of the optical fiber 200 connected to the end face inspection device 180.

The optical power meter 103, the OTDR measurer 104, and the end face analyzer 105 are functionally independent from each other. The OTDR measurer 104 further performs the OTDR measurement for the optical fiber 200 connected to the light emission/receiving port 110. The optical power meter 103 performs the optical power measurement for the optical fiber 200 connected to the light receiving port 120. The end face analyzer 105 performs the end face inspection for the optical fiber 200 connected to the end face inspection device 180. Thus, the OTDR measurement, the optical power measurement, and the end face inspection can be simultaneously performed. Further, visible light can be emitted in parallel to the OTDR measurement.

Figure 2:
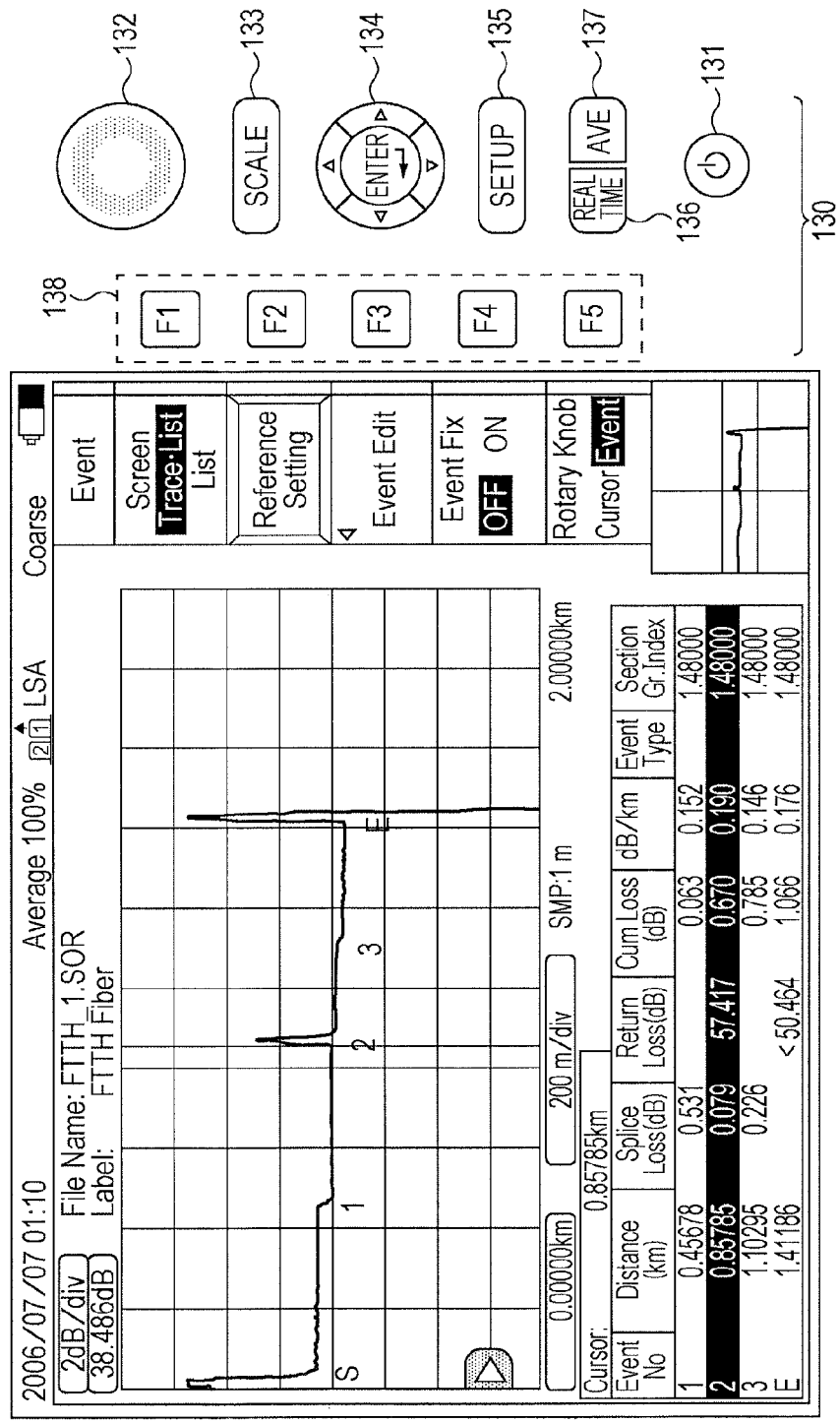
FIG. 2 illustrates an example exterior appearance of an operation receiver and a display.

The operation receiver 130 receives various operations from the user. The display 140 displays, e.g., a menu and measurement results based on the display control of the controller 101. FIG. 2 illustrates the exterior appearance of the operation receiver 130 and the display 140. In the present embodiment, the operation receiver 130 includes a power switch 131, a rotary knob 132, a scale key 133, a direction/enter key 134, a setup (SETUP) key 135, a real time measurement (REAL TIME) key 136, an averaging (AVE) key 137, and a function key 138.

Figure 3A:
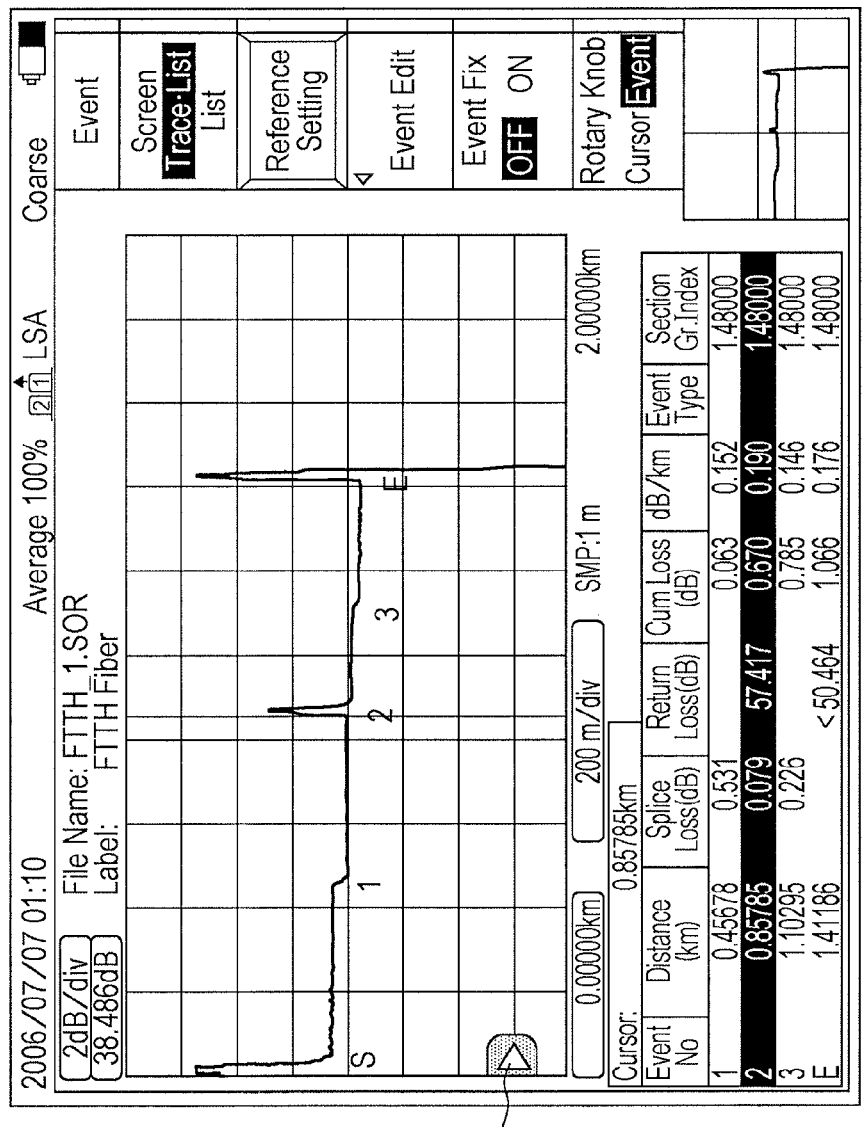
FIG. 3A illustrates an OTDR measurement screen.

The characteristic menu system and operation of the optical pulse tester 100 having the above-described configuration will be described. In the optical pulse tester 100 of the present embodiment, the controller 101 displays, in execution of the OTDR function, an OTDR measurement screen as a main screen (a main function) on the display 140 as illustrated in FIG. 3A. This OTDR measurement screen shows information (e.g., the results of the OTDR measurement) on execution of the OTDR function.

Moreover, in the optical pulse tester 100, the controller 101 creates an arrow icon 142 on the OTDR measurement screen. The arrow icon 142 is the icon for displaying a launcher menu for selecting (calling) the auxiliary function.

Figure 3B:
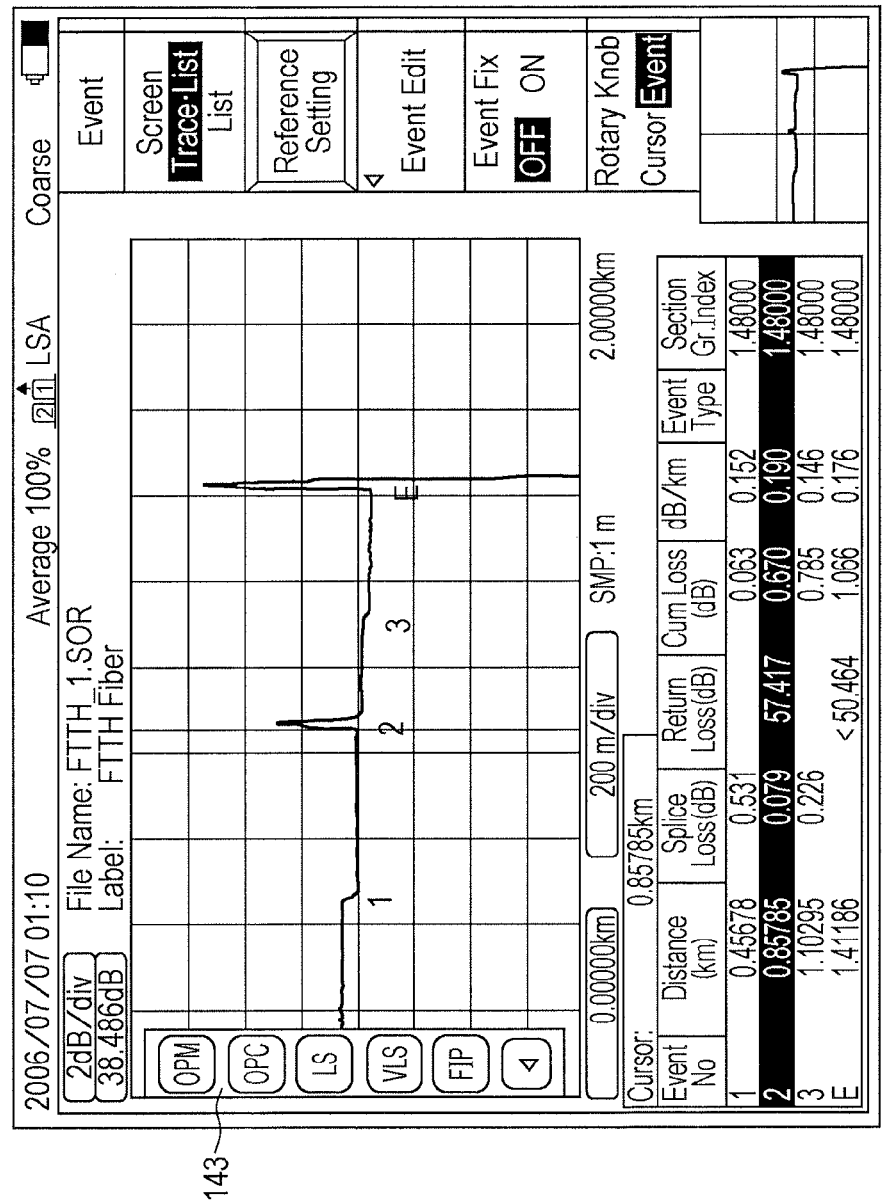
FIG. 3B illustrates a launcher menu displayed on the OTDR measurement screen.

When the operating person selects the arrow icon 142, the controller 101 pops up, as illustrated in FIG. 3B, a launcher menu 143 on the OTDR measurement screen.

The launcher menu 143 includes an "OPM" icon, an "LS" icon, a "VLS" icon, and an "FIP" icon. The "OPM" icon is the icon for calling the optical power meter function. The "LS" icon is the icon for calling the stabilized light source function. The "VLS" icon is the icon for calling the visible light source function. The "FIP" icon is the icon for calling the fiber end face inspection function.

As described above, in the optical pulse tester 100 of the present embodiment, each auxiliary function can be called without returning to the top screen during execution of the OTDR measurement. Thus, in the case of performing a series of operation for a plurality of optical fibers, it is not necessary to frequently switch a screen. This can prevent or reduce complication of the operation.

When a certain auxiliary function is called from the launcher menu 143, a sub-screen for such an auxiliary function is displayed on the OTDR measurement screen (displayed to overlap the OTDR measurement screen). The operating person can use the called sub-screen to execute the auxiliary function. Information on execution of the auxiliary function called by the operating person is displayed on the sub-screen. The controller 101 continues the OTDR measurement even during displaying of the sub-screen.

Figure 4:
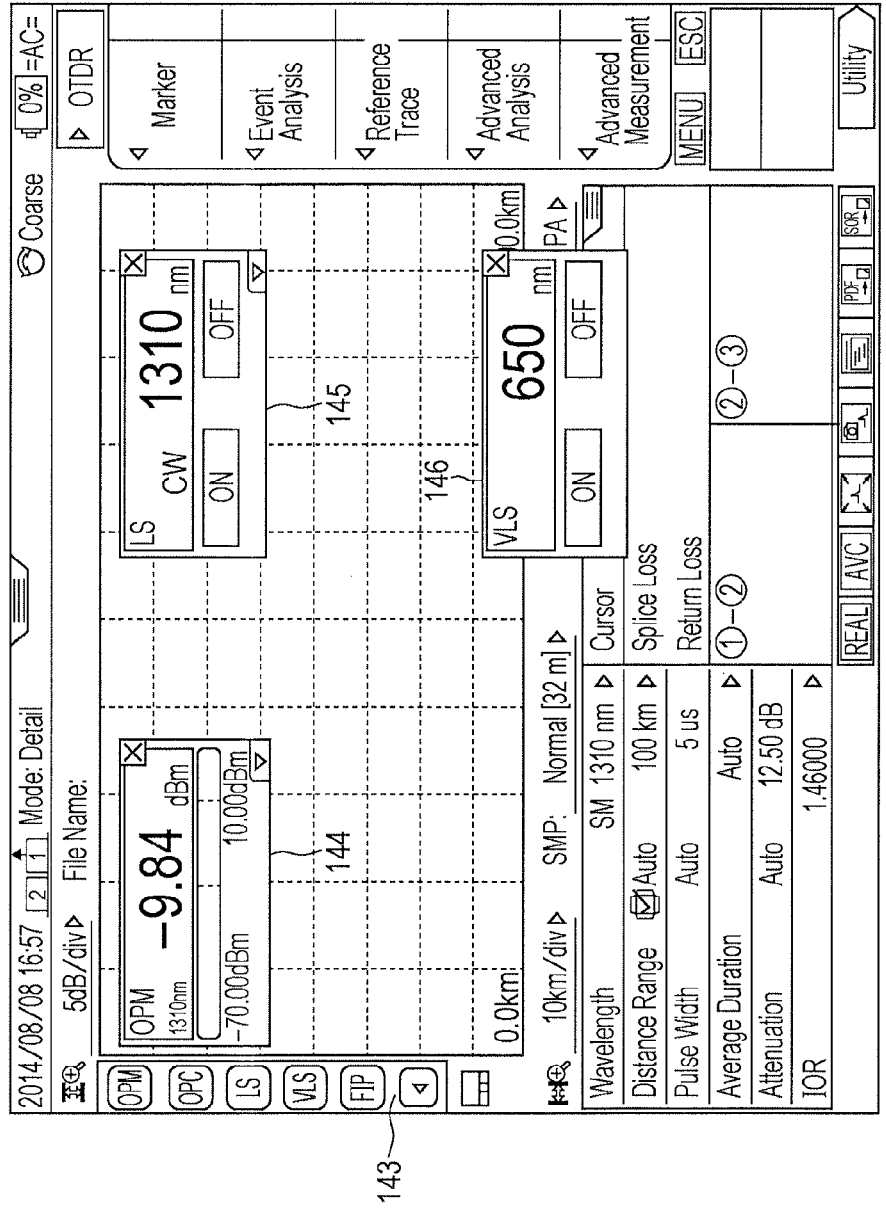
FIG. 4 illustrates sub-screens of auxiliary functions displayed on the OTDR measurement screen.

For example, when the "OPM" icon for calling the optical power meter function is selected from the launcher menu 143, an optical power measurement sub-screen 144 indicating an optical power measurement value is displayed on an OTDR measurement screen 141 as illustrated in FIG. 4. When the "LS" icon for calling the stabilized light source function is selected from the launcher menu 143, a stabilized light emission sub-screen 145 instructing ON/OFF of light emission is displayed on the OTDR measurement screen 141 as illustrated in FIG. 4.

When the "VLS" icon for calling the visible light source function is selected from the launcher menu 143, a visible light emission sub-screen 146 instructing ON/OFF of light emission is displayed on the OTDR measurement screen 141 as illustrated in FIG. 4. Similarly, when the "FIP" icon for calling the fiber end face inspection function is selected from the launcher menu 143, an end face inspection sub-screen (not shown) is displayed on the OTDR measurement screen 141.

The controller 101 controls the light source/measurer 102, the optical power meter 103, or the end face analyzer 105 according to the auxiliary function execution instruction input by the operating person via the sub-screen, and then, executes the called auxiliary function. The controller 101 continues the OTDR measurement even during execution of the auxiliary function.

That is, the controller 101 performs the auxiliary function using the port other than the light emission/receiving port 110 in parallel to execution of the OTDR function. Specifically, the controller 101 can perform, in parallel to the OTDR function, the optical power meter function, the fiber end face inspection function, and the visible light source function. Thus, during execution of the OTDR measurement of a certain optical fiber 200, the end face inspection of another optical fiber 200 and the optical power measurement of still another optical fiber 200 can be performed.

Figure 5:
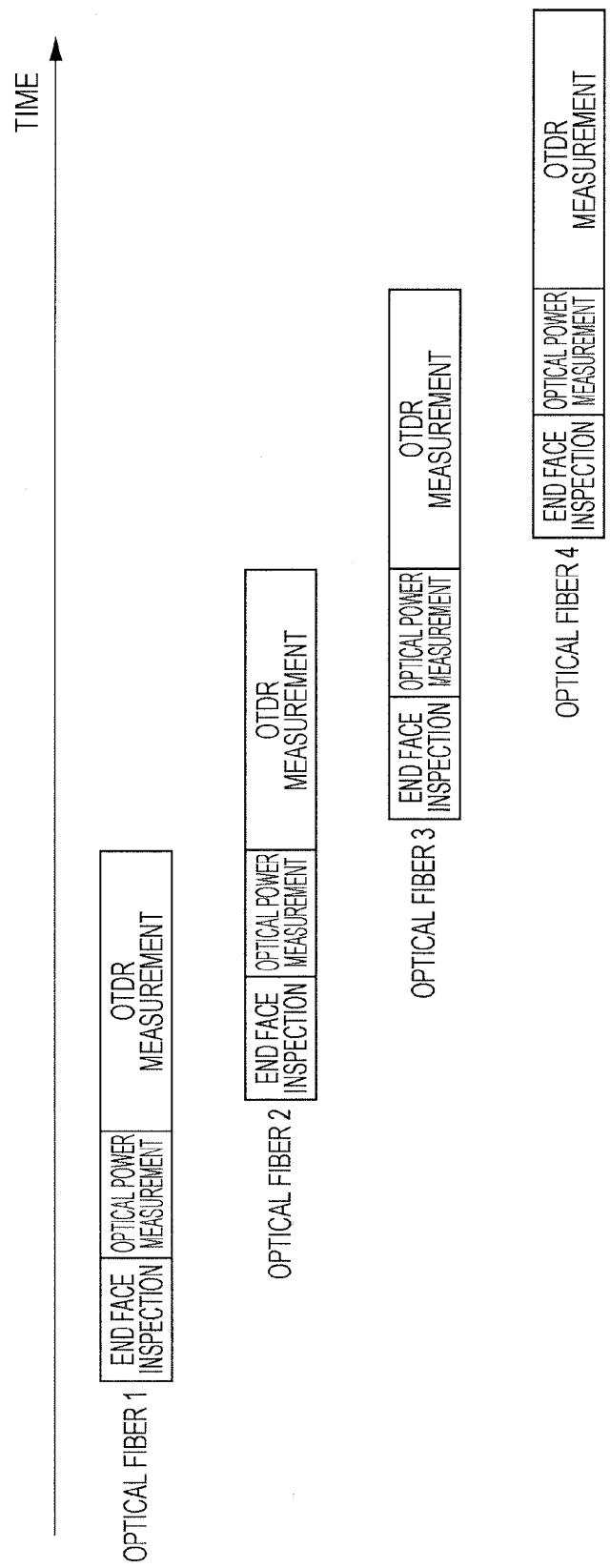
FIG. 5 is a diagram illustrating parallel processing for different optical fibers.
Figure 6:
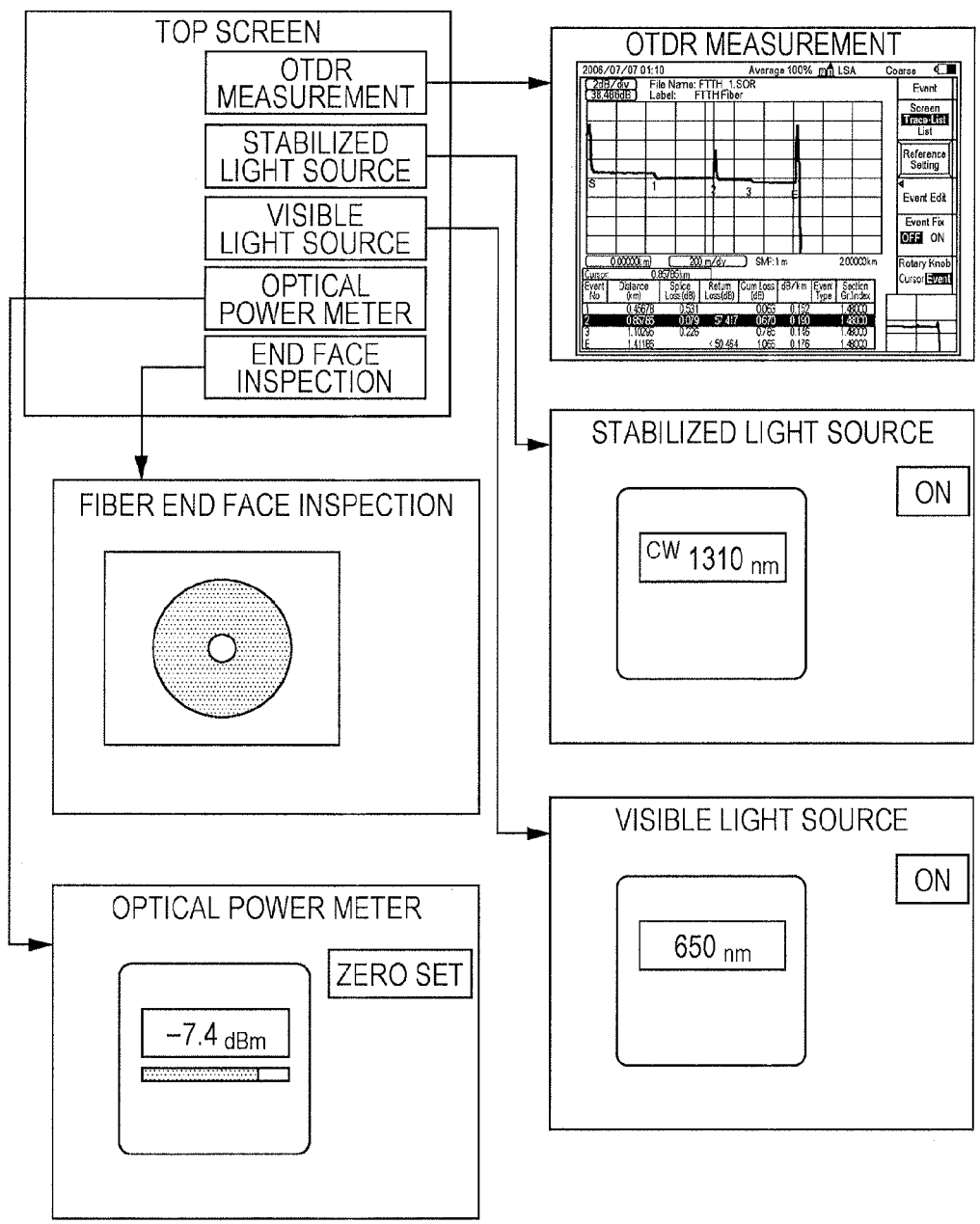
FIG. 6 is a view illustrating a menu system of a typical optical pulse tester having a plurality of auxiliary functions.

That is, as illustrated in FIG. 5, after the end face inspection and the optical power measurement are performed for an optical fiber 1, the OTDR measurement is performed. In this case, during the OTDR measurement of the optical fiber 1, the end face inspection and the optical power measurement can be performed for an optical fiber 2. Then, during the OTDR measurement of the optical fiber 2, the end face inspection and the optical power measurement can be performed for an optical fiber 3.

As described above, in the optical pulse tester 100 of the present embodiment, right after the OTDR measurement for a certain optical fiber is completed, the OTDR measurement can be performed for a next optical fiber. Thus, the operation efficiency can be enhanced, and the operation time for a plurality of optical fibers can be shortened.

Note that the optical pulse tester 100 may include, as the auxiliary functions on measurement of the optical fiber, at least one of the stabilized light source function, the visible light source function, the optical power meter function, and the fiber end face inspection function.

Moreover, in the present embodiment, the light source/measurer 102 performs, in execution of the stabilized light source function, the light emission processing of continuous light emitted to the optical fiber 200 connected to the light emission/receiving port 110, but the present embodiment is not limited to such a configuration. The optical pulse tester 100 may include, other than the light emission/receiving port 110, the port (a port for continuous light emission) for executing the stabilized light source function. In this configuration, the controller 101 can executes the stabilized light source function using the port for continuous light emission in parallel to the OTDR function using the light emission/receiving port 110.

The embodiment of the present disclosure relates to an optical pulse tester configured to perform OTDR measurement, and particularly relates to an optical pulse tester having auxiliary functions such as an optical power meter function and a fiber end face inspection function.

The optical pulse tester of the embodiment of the present disclosure may be one of first to fourth optical pulse testers described below.

The first optical pulse tester is an optical pulse tester having the OTDR function of measuring the time distribution of the return light power of an optical pulse input to an optical fiber. In the first optical pulse tester, the menu for calling an auxiliary function for measurement of the optical fiber is displayed on an OTDR measurement screen indicating information on execution of the OTDR function, and a sub-screen indicating information on execution of the called auxiliary function is displayed on the OTDR measurement screen.

The second optical pulse tester is configured such that in the first optical pulse tester, execution of the OTDR function is not interrupted in execution of the called auxiliary function.

The third optical pulse tester is configured such that in the first or second optical pulse tester, the auxiliary function includes any of the stabilized light source function of continuously emitting measurement light, the visible light source function of emitting visible light, the optical power meter function of measuring the power of input light, and a fiber end face inspection function.

The fourth optical pulse tester is configured such that in any of the first to third optical pulse testers, the menu for calling the auxiliary function is popped up by a predetermined operation.

According to the first to fourth optical pulse testers, operation efficiency in processing for a plurality of optical fibers can be improved in an optical pulse tester having auxiliary functions.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical pulse tester comprising:
    an OTDR measurer configured to execute an OTDR function of measuring a time distribution of a power of return light of an optical pulse input to an optical fiber;
    a display configured to display an OTDR measurement screen indicating information on execution of the OTDR function; and
    a controller configured to control the OTDR measurer and the display, wherein
    the controller displays, on the OTDR measurement screen, a menu for allowing an operating person to call an auxiliary function for measurement of the optical fiber, and
    displays, on the OTDR measurement screen, a sub-screen indicating information on execution of the auxiliary function called by the operating person.

2. The optical pulse tester according to claim 1, wherein the auxiliary function includes at least one of a stabilized light source function of continuously emitting measurement light, a visible light source function of emitting visible light, an optical power meter function of measuring a power of light emitted from the optical fiber, and a fiber end face inspection function.

3. The optical pulse tester according to claim 1, wherein the controller pops up the menu according to a predetermined operation of the operating person.

4. The optical pulse tester according to claim 1, further comprising:
    a first port for the OTDR function;
    a second port for the auxiliary function for the measurement of the optical fiber; and
    an auxiliary function executer configured to execute the auxiliary function for the measurement of the optical fiber, wherein
    the controller controls the auxiliary function executer.

5. The optical pulse tester according to claim 4, wherein the controller controls the auxiliary function executer according to an execution instruction of the operating person input to the sub-screen, and executes the called auxiliary function.

6. The optical pulse tester according to claim 5, wherein the controller executes the OTDR function and the auxiliary function in parallel.

* * * * *